(12) United States Patent
Zhang et al.

(10) Patent No.: US 12,214,341 B1
(45) Date of Patent: Feb. 4, 2025

(54) METHOD FOR PREPARING A CATALYST FOR PYROLYSIS OF WASTE PLASTICS TO PRODUCE OIL AND USE THEREOF

(71) Applicant: SHANDONG UNIVERSITY OF SCIENCE AND TECHNOLOGY, Qingdao (CN)

(72) Inventors: Yaqing Zhang, Qingdao (CN); Jiayu Zhu, Qingdao (CN); Peng Liang, Qingdao (CN); Xiang Wang, Qingdao (CN); Haifeng Zhou, Qingdao (CN); Tiantian Jiao, Qingdao (CN); Qing Liu, Qingdao (CN); Xiangping Li, Qingdao (CN); Guoming Zhao, Qingdao (CN); Wenrui Zhang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/676,367

(22) Filed: May 28, 2024

(51) Int. Cl.
| | |
|---|---|
| *B01J 37/02* | (2006.01) |
| *B01J 21/18* | (2006.01) |
| *B01J 23/06* | (2006.01) |
| *B01J 23/28* | (2006.01) |
| *B01J 23/34* | (2006.01) |
| *B01J 23/75* | (2006.01) |
| *B01J 23/755* | (2006.01) |
| *B01J 37/00* | (2006.01) |
| *B01J 37/06* | (2006.01) |
| *B01J 37/08* | (2006.01) |
| *B01J 37/34* | (2006.01) |
| *C10B 53/07* | (2006.01) |
| *C10B 57/12* | (2006.01) |
| *C10G 1/10* | (2006.01) |

(52) U.S. Cl.
CPC .......... *B01J 37/0207* (2013.01); *B01J 21/18* (2013.01); *B01J 23/06* (2013.01); *B01J 23/28* (2013.01); *B01J 23/34* (2013.01); *B01J 23/75* (2013.01); *B01J 23/755* (2013.01); *B01J 37/0036* (2013.01); *B01J 37/009* (2013.01); *B01J 37/0236* (2013.01); *B01J 37/06* (2013.01); *B01J 37/08* (2013.01); *B01J 37/343* (2013.01); *C10B 53/07* (2013.01); *C10B 57/12* (2013.01); *C10G 1/10* (2013.01); *C10G 2300/1003* (2013.01)

(58) Field of Classification Search
CPC ........ B01J 37/0207; B01J 21/18; B01J 23/06; B01J 23/28; B01J 23/34; B01J 23/75; B01J 23/755; B01J 37/0036; B01J 37/009; B01J 37/0236; B01J 37/06; B01J 37/08; B01J 37/343; C10B 53/07; C10B 57/12; C10G 1/10; C10G 2300/1003

USPC ... 502/5, 324, 325, 305, 337, 343, 182, 183, 502/185; 44/620; 208/403, 428
See application file for complete search history.

(56) References Cited

U.S. PATENT DOCUMENTS

2014/0155662 A1   6/2014   Nor

FOREIGN PATENT DOCUMENTS

| CN | 101992113 A | * | 3/2011 | ............. B01J 27/25 |
|---|---|---|---|---|
| CN | 102764671 A | * | 2/2013 | ............. B01J 29/70 |
| CN | 104557130 A | * | 4/2015 | ............. C04B 38/04 |
| CN | 104743573 A | * | 7/2015 | ............. C01B 39/38 |
| CN | 105170199 A | * | 12/2015 | ............. B01J 23/30 |
| CN | 106219568 A | * | 12/2016 | ............. C01B 39/38 |
| CN | 106311244 A | * | 1/2017 | ............. Y02E 50/10 |
| CN | 111644176 A | * | 9/2020 | ............. B01J 23/755 |
| CN | 112044425 A | * | 12/2020 | ............. B01J 21/16 |
| CN | 112251253 A | * | 1/2021 | ............. C10G 1/086 |
| CN | 114507542 A | * | 5/2022 | ............. C10G 1/008 |
| CN | 114656318 A | * | 6/2022 | ............. C07C 4/06 |
| CN | 115340424 A | * | 11/2022 | ............. C05F 17/50 |
| CN | 116328854 A | * | 6/2023 | ............. B01J 23/06 |

OTHER PUBLICATIONS

Qinwen Zheng et al., "Environmental hazards and comprehensive utilization of solid waste coal gangue." Progress in Natural Science: Materials International 34, pp. 223-239. (Year: 2024).*
Jiayan Li et al., "Comprehensive utilization and environmental risks of coal gangue: A review." Journal of Cleaner Production 239, pp. 1-18. (Year: 2019).*
Zhu Shu et al., "Template-free preparation of mesoporous silica and alumina from natural kaolinite and their application in methylene blue adsorption", Applied Clay Science, vol. 102, Nov. 8, 2014, entire document.
Xinghai Li et al., "Study on nanometer SiO2 powder extracted from coal gangue", New Chemical Materials, vol. 42, No. 11, Nov. 30, 2014, entire document.

* cited by examiner

*Primary Examiner* — Patricia L. Hailey (57) ABSTRACT

The present disclosure provides a method for preparing a catalyst for pyrolysis of waste plastics to produce oil, comprising: washing and modifying coal gangue powder with acid, and then placing in an alkaline solution, etching under magnetic stirring for 20-30 minutes, and washing with water until neutral; placing the catalyst washed until neutral in a metal solution, loading the metal by impregnation, and then filtering and washing; then placing the catalyst in the molding machine and adding adhesive and water, to compress into a suitable shape, drying, and finally calcinating to activate to obtain a product. The present disclosure not only solves the problem of waste plastic pollution, but also obtains fuel oil with high valuable products while reducing the cost of waste plastic treatment, and also improves the yield of fuel oil.

6 Claims, 7 Drawing Sheets

METHOD FOR PREPARING A CATALYST FOR PYROLYSIS OF WASTE PLASTICS TO PRODUCE OIL AND USE THEREOF

FIELD

The present disclosure relates to a technical field of a catalyst for pyrolysis of the waste plastics, specifically to a method for preparing a catalyst for pyrolysis of waste plastics to produce oil and use thereof.

BACKGROUND

Recently, the pyrolysis method of waste plastics has been widely studied as one of the methods for recycling the plastics. The waste plastics can be converted into energy sources by the pyrolysis process. However, due to the high energy consumption of the pyrolysis process, the cost of obtaining energy sources increases. Thus, a series of studies have been performed on the catalysts for pyrolysis of the plastics. Currently, the catalysts as reported for pyrolysis of waste plastics to produce oil mainly include zeolite catalysts (ZSM-5, Y-type molecular sieve, β-type molecular sieve), $SiO_2$—$Al_2O_3$ catalyst, transition metal supported catalysts for fly ash and activated carbon, etc.

CN201010557031.9 discloses a method for preparing a catalyst for pyrolysis of waste plastics to produce light fuel oil and use thereof, comprising:

(1) grinding and sieving the fly ash, and selecting the fly ash with a mesh size greater than 200; (2) acid modification: adding an acid solution to the fly ash of step (1) and stirring for 25-35 minutes; adding 1 g of fly ash to every 1-4 ml of acid solution; (3) after filtration, drying in an oven to remove moisture; (4) calcinating and activating: placing the dried fly ash into a muffle furnace and calcinating; (5) molding: mixing the calcinated and activated fly ash and adhesive in a mass ratio of 2:1, adding 3% dilute nitric acid solution, kneading, and extruding into shape; (6) after the molded fly ash is naturally air dried, placing in a muffle furnace for calcinating; (7) modification of the molded fly ash: modifying the molded fly ash of step (6) with metal nitrates using an equal volume impregnation method to obtain fly ash modified with any one of nickel oxide, iron oxide, or lanthanum oxide.

The catalyst prepared by the fly ash is subjected to acid impregnation treatment and placed in the corresponding metal salt solution to obtain a metal supported catalyst by impregnation. Due to the uneven distribution of its pore structure, the metal distribution is uneven, the catalytic efficiency is low, and the obtained fuel oil has poor quality and low yield. The pore structure of the supported transition metal catalysts such as molecular sieve catalysts, silicon aluminum catalysts, and activated carbon is mainly microporous, so the yield and quality of fuel oil obtained by pyrolysis are not high.

It can be seen that the catalysts and its preparation method for pyrolysis of waste plastics to produce oil in existing technologies still need further improvement.

SUMMARY

One of the objectives of the present disclosure is to provide a method for preparing a catalyst for pyrolysis of waste plastics to produce oil, using the industrial solid waste coal gangue as raw material, which is processed and molded to have the acidity required for pyrolysis catalysts and a pore structure that can provide reaction active sites. This confirms that there are enough active sites during catalytic pyrolysis of waste plastics, thereby obtaining a pyrolysis product, i.e. fuel oil. This not only solves the problem of waste plastic pollution, but also reduces the cost of waste plastic treatment while obtaining the valuable product fuel oil, and also improves the yield of fuel oil.

The present disclosure provides the following technical solutions:

a method for preparing a catalyst for pyrolysis of waste plastics to produce oil, wherein comprising:

Step 1: washing and modifying coal gangue powder with acid to obtain acid-modified coal gangue powder;

Step 2: placing the acid-modified coal gangue powder of Step 1 in an alkaline solution, and etching under magnetic stirring for 20-30 minutes, then washing with water until neutral;

Step 3: placing the washed coal gangue powder of step 2 in a solution containing metal ions, and loading the metal ions onto the washed coal gangue powder by impregnation, and then filtering and washing to obtain a catalyst loaded with metal;

Step 4: placing the catalyst loaded with metal of Step 3 into a molding machine, and adding with adhesive and water, to compress into a shape;

Step 5: drying the compressed catalyst of Step 4, then calcinating in a muffle furnace, and activating to obtain a product;

wherein in Step 2, the alkaline solution is a weak base with a concentration of 0.5 mol·$L^{-1}$;

a volume ratio of the coal gangue powder to the weak base is 1:1.0-1.5; and the weak base is a solution of n-butylamine.

The technical effects provided by the above technical solutions are:

grinding the coal gangue as raw material into powder, and mixing with acid to obtain acid-modified coal gangue powder, wherein the main body of the coal gangue is silicon aluminum oxide, and also contains rich metal elements such as calcium, iron, and magnesium. After modified with acid, the coal gangue has an appropriate acidity as the pyrolysis catalyst; then, etching the acid-modified coal gangue powder in an alkaline solution, which can further obtain a relatively uniform pore structure that can provide reaction active sites, ensuring the uniformity of metal load in the later stage, and then drying and calcinating.

In one embodiment of the present disclosure, the weak base is $NH_3·H_2O$, n-butylamine solution, or pyrrole solution.

It is found that the use of weak base in the etching step is more effective than the use of a strong base by further experimental verification, because its strong alkalinity of the strong base will destroy the main structure of silicon and aluminum, and the strong base will react with the exposed metal elements, and the reaction products will attach on the surface of the catalyst and cover the active sites, resulting in the catalyst lose most of its catalytic effect.

In another embodiment of the present disclosure, in step 1, grinding the coal gangue into the coal gangue powder, and sieving the coal gangue powder into 30-50 meshes. The washing and modifying with acid is to evenly mix the coal gangue powder with an acid solution, and then washing with acid under ultrasonic at 25-50° C. for 10-20 minutes, then removing the surface impurities by washing with water, and washing until neutral.

Furthermore, the acid solution is hydrochloric acid or nitric acid or a mixture thereof.

Furthermore, the alkaline solution is a n-butylamine solution.

By comparing several weak bases, it is found that using n-butylamine solution is more effective than using other weak bases, because n-butylamine solution as an organic weak base has a moderate alkalinity and will not significantly destroy the silicon-aluminum main structure of the coal gangue like strong bases and $NH_3 \cdot H_2O$. Compared with pyrrole solution, n-butylamine solution can effectively etch the surface of the coal gangue, form uniformly sized pores, expand the specific surface area, and the moderate alkalinity will not influence the suitable acidity required for pyrolysis.

Furthermore, in Step 3, the solution containing metal ions is nickel nitrate, zinc nitrate, manganese nitrate, cobalt nitrate, or ammonium molybdate, with a metal loading of 5%.

Furthermore, in Step 4, the shape is strip, ingot, single column, annular or spherical.

Furthermore, in Step 5, drying the compressed catalyst in a vacuum dryer at 100-120° C. for 8-10 hours; calcinating in the muffle furnace at 500-600° C. for 4-5 hours.

Another object of the present disclosure is to provide a use of a catalyst prepared by the above preparation method, comprising: using a two-stage fixed bed reactor for catalytic pyrolysis of waste plastics, and placing the catalyst prepared by the above preparation method in a catalytic sleeve.

In the above applications, the waste plastics include kitchen waste, textiles, rubber elastomer debris, thermoplastic elastomer debris, or a mixture of two or more.

Compared with existing technology, the present disclosure brings the following beneficial technical effects:

(1) the coal gangue as the raw material for the pyrolysis catalyst of waste plastics is easily available and cost effective. More importantly, the waste is recycled and it provides a solution for the treatment of solid waste and waste plastics from coal mining.

(2) an excellent catalyst for pyrolysis of the waste plastics with rich alkaline earth metal elements and uniform pore structure is prepared by using the coal gangue as the raw material, washing with acid, etching with alkali, and loading with metal.

(3) The present disclosure compares different catalysts obtained from different basene etching treatments and selects the catalyst obtained from n-butylamine etching. The catalyst catalyzes the pyrolysis of the waste plastics to obtain higher yield of pyrolysis oil and high-quality oil.

(4) A catalyst for pyrolysis of the waste plastics of the present disclosure has abundant alkaline earth metal elements compared with ordinary molecular sieves and silicon aluminum catalysts, and is superior to similar fly ash catalysts containing more alkaline earth metal elements to obtain uniform pore structure, and has catalyst pore structure and alkaline earth metal, both will affect the catalytic performance of the catalyst. Therefore, it can provide more reactive sites during the catalytic process, more macromolecular cracking, and obtain high yield and high-quality pyrolysis fuel oil.

BRIEF DESCRIPTION OF THE DRAWINGS

wherein: 1. Air inlet, 2. Quartz tube reactor, 3. Pyrolysis sleeve, 4. Support pipe, 5. Catalytic sleeve, 6. Ice salt bath, 7. Air bag, 8. Temperature controller, 9. Insulation layer.

DETAILED DESCRIPTION

The present invention is described below in further detail with reference to the accompanying drawings and specific implementations.

The raw materials of the present disclosure can be purchased in commercial.

The "adhesive" in the present disclosure refers to the high-temperature resistant adhesive HR-8767.

The "waste plastics" in the present disclosure includes kitchen waste, textiles, rubber or thermoplastic elastomer debris, or a mixture of two or more.

Figure 1:
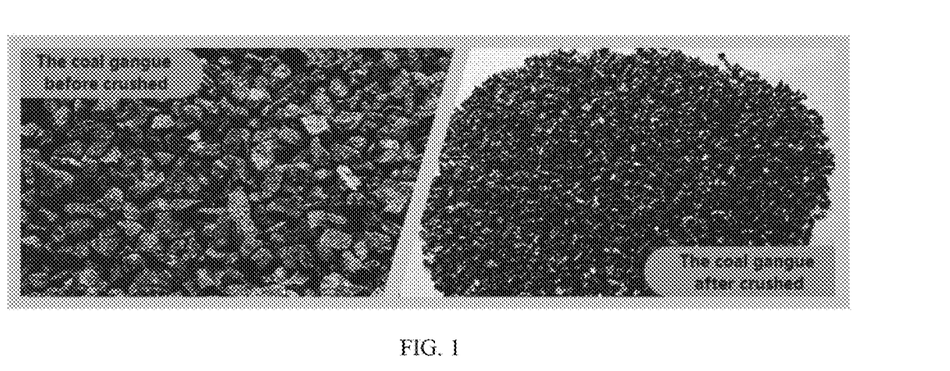
FIG. 1 is a schematic diagram of the raw material of a catalyst for pyrolysis of the waste plastics of the present disclosure, i.e. the coal gangue before and after crushed.
Figure 2:
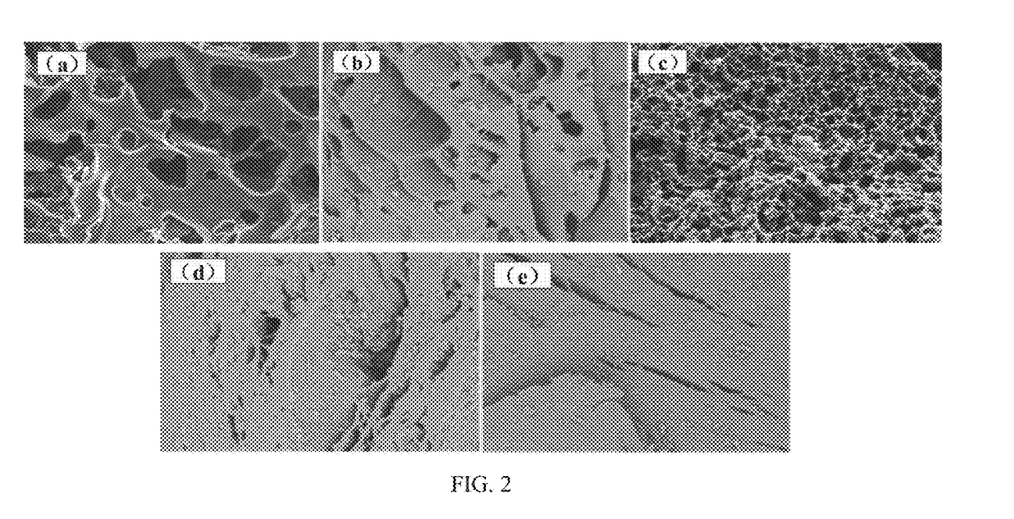
FIG. 2 is a schematic diagram of the coal gangue etched by different base during the method for preparing a catalyst for pyrolysis of the waste plastics of the present disclosure, wherein: (a) NaOH, (b) $NH_3 \cdot H_2O$, (c) n-butylamine, (d) pyrrole, (e) not etched.

As shown in FIG. 1, the coal gangue is used as the raw material, which is first crushed and then ground into powder for use. A comparison of the coal gangue etched by different base and unearthed during the preparation of a catalyst for pyrolysis of the waste plastics of the present disclosure is shown in FIG. 2.

A method for preparing a catalyst for pyrolysis of waste plastics to produce oil, comprising:

Step 1: washing and modifying coal gangue powder with acid to obtain acid-modified coal gangue powder; the specific steps are as follows: grinding the coal gangue into the coal gangue powder, sieving the coal gangue powder into 30-50 mesh, washing and modifying with acid is to evenly mix the coal gangue powder with an acid solution, and washing with acid under ultrasound at 25-50° C. for 10-20 minutes, and then removing surface impurities by washing with water, and washing until neutral; the acid solution is hydrochloric acid, nitric acid, or a mixture thereof. When the acid solution is a mixture of hydrochloric acid and nitric acid, the volume ratio of hydrochloric acid to nitric acid is 1:1 to 2;

Step 2: placing the coal gangue powder in an alkaline solution and etching under magnetic stirring for 20-30 minutes, then washing with water until neutral; the alkaline solution is $NH_3 \cdot H_2O$, n-butylamine or pyrrole solution, and the concentration of the alkaline solution is 0.5 mol·$L^{-1}$; a volume ratio of the coal gangue powder to the alkaline solution is 1:1.0-1.5;

Step 3: placing the catalyst of step 2 in a solution containing metal ions, and loading the metal ions onto the catalyst by impregnation, and then filtering and washing to obtain the catalyst loaded with metal; the solution containing metal ions is nickel nitrate, zinc nitrate, manganese nitrate, cobalt nitrate or ammonium molybdate, with a metal loading of 5%;

Step 4: placing the catalyst loaded with metal of Step 3 into a molding machine, and adding with adhesive and water, to compress into a suitable shape; if the molding machine is an extrusion machine, a strip shape can be obtained.

Step 5: drying the compressed catalyst of Step 4 in a vacuum dryer at 100-120° C. for 8-10 hours; calcinating the dried catalyst in a muffle furnace at 500-600° C. for 4-5 hours, to obtain a product.

Figure 8:
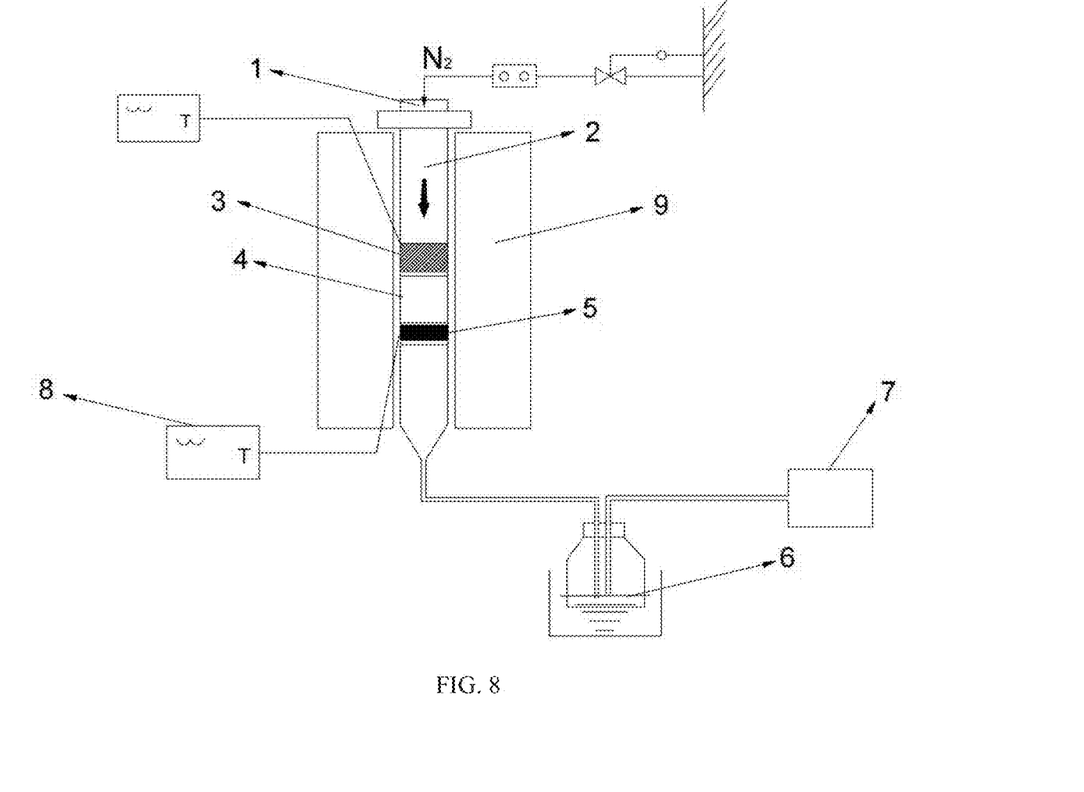
FIG. 8 shows the structural diagram of a two-stage fixed bed reactor for catalytic pyrolysis of the waste plastics in the application of the catalyst of the present disclosure.

A catalyst for pyrolysis of the waste plastics prepared by the preparation method is placed in a two-stage fixed bed reactor for catalytic pyrolysis of the waste plastics as shown in FIG. 8, the bed reactor including an inlet 1, a quartz tube reactor 2, a pyrolysis sleeve 3, a support tube 4, a catalytic sleeve 5, an ice salt bath 6, an air bag 7, a temperature controller 8, and an insulation layer 9. The air inlet 1 is located at the top of the quartz tube reactor 2, and a pyrolysis sleeve 3 is provided in the middle of the quartz tube reactor 2. A support tube 4 is connected below the pyrolysis sleeve 3, and a catalytic sleeve 5 is connected below the support tube 4. The catalyst prepared by the preparation method of the present disclosure is located inside the catalytic sleeve 5. The periphery of the quartz tube reactor 2 is provided with an insulation layer 9, and two groups of the temperature controller 8 is provided, one group connected to the pyrolysis sleeve and the other group connected to the catalytic sleeve. The pyrolysis atmosphere is $N_2$, which is introduced into the quartz tube reactor from the top inlet. The pyrolysis sleeve is used to place the waste plastics shavings as the raw material, and the support pipe is used to provide a diffusion space for the volatile matter and prevent mixing of the waste plastics with the catalyst. The catalytic sleeve is used to place the catalyst. The quartz cotton can be added to the catalytic sleeve to fix the catalyst, in order to recycle the catalyst conveniently. The liquid phase of the product is cooled by the ice salt bath, and the non-condensable gases are collected by the air bag. The pyrolysis temperature and catalytic temperature are controlled by the temperature controller respectively, and an insulation layer is provided outside the reactor.

Embodiment 1

A catalyst for pyrolysis of the waste plastics using the coal gangue as the raw material, comprising:

(1) grinding 10 g of the coal gangue into powder, selecting 40 mesh coal gangue powder, and placing into an acid mixture. The acid mixture includes 16% hydrochloric acid and 30% nitric acid by mass, with a volume ratio of 1:1. After mixing the coal gangue powder and the acid mixture evenly, placing on a shaking oscillator at 30° C. for 15 minutes, and then washing with pure water until neutral to obtain acid-modified coal gangue powder;

(2) placing the acid-modified coal gangue powder of step (1) into a NaOH solution, and etching under magnetic stirring for 25 minutes, then washing with water until neutral;

(3) washing the catalyst of step (2) with water until neutral and mixing with different solutions containing metal ions. The solutions containing metal ions are nickel nitrate, zinc nitrate, manganese nitrate, cobalt nitrate, or ammonium molybdate solution; loading the catalyst with a loading capacity of 5% for each metal using an equal-volume impregnation method; after filtration, washing with deionized water until neutral to obtain a catalyst with a loading capacity of 5%.

(4) placing the metal loaded catalysts of step (3) into the molding machine, and adding 4 g of high-temperature resistant adhesive HR-8767 and an appropriate amount of water; after molding, drying in a vacuum dryer at 110° C. for 10 hours until the liquid disappears; then calcinating the catalyst in a muffle furnace at 550° C. for 4 hours to activate and ultimately produce five different metal modified catalysts.

Figure 3:
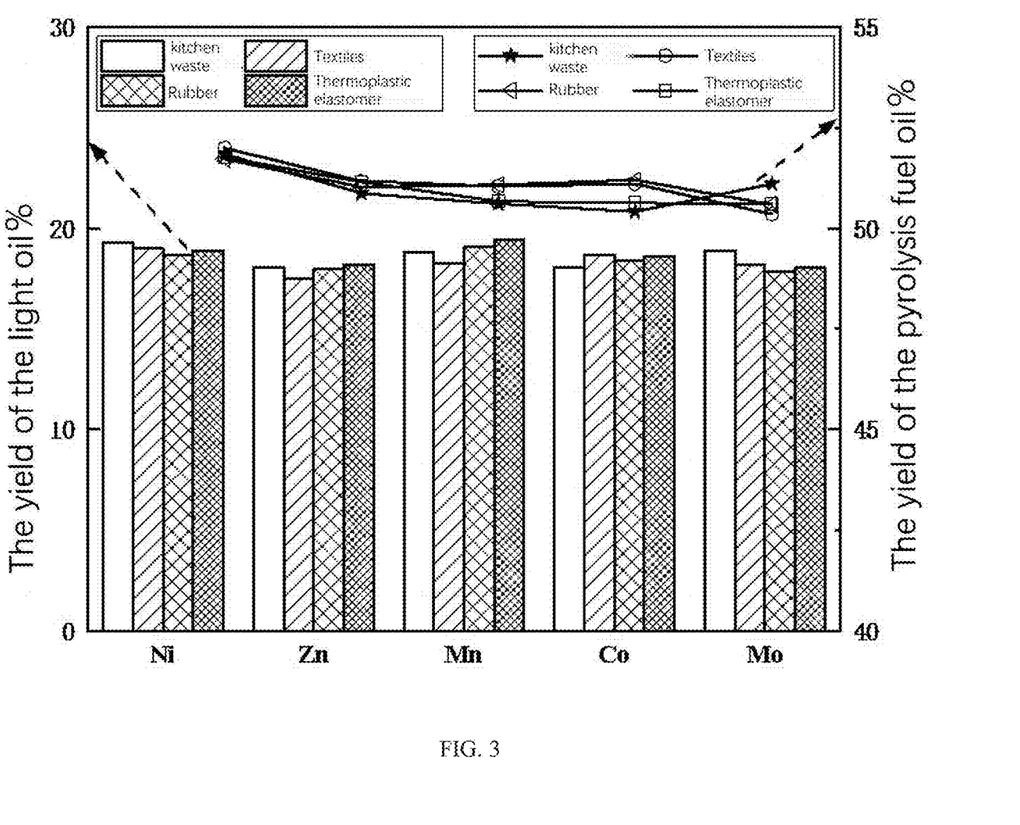
FIG. 3 shows the yield of the fuel oil and the light oil from the catalytic pyrolysis of the waste plastics using a catalyst prepared by the NaOH etched coal gangue.

Performing the experiments pyrolysis of the waste plastics using the five catalysts prepared in this embodiment:

Four catalytic pyrolysis experiments are performed on the kitchen waste, textiles, rubber, and thermoplastic elastomer debris from a garbage treatment plant using the catalyst prepared in Embodiment 1. 10 g of waste plastic and 5 g of metal modified coal gangue catalyst are placed in the pyrolysis section and catalytic section sleeves of a two-stage fixed bed reactor for the catalytic pyrolysis experiments. The pyrolysis section and catalytic section temperatures are 550° C. and 500° C., respectively. The pyrolysis is performed for 30 minutes, and the bottom liquid phase product pyrolysis oil is collected. Light oil and heavy oil are extracted and separated, and weighed separately. The production of the pyrolysis product fuel oil and light oil are shown in Table 1, and the yield of the pyrolysis fuel oil and light oil are shown in FIG. 3.

TABLE 1

Production of light oil and heavy oil from pyrolysis of the waste plastics using catalyst prepared by NaOH solution etching

| | Ni modified | | Zn modified | | Mn modified | | Co modified | | Mo modified | |
|---|---|---|---|---|---|---|---|---|---|---|
| | light oil/g | heavy oil/g | light oil/g | heavy oil/g | light oil/g | heavy oil/g | light oil/g | heavy oil/g | light oil/g | heavy oil/g |
| kitchen waste | 1.929 | 3.256 | 1.802 | 3.285 | 1.884 | 3.177 | 1.809 | 3.232 | 1.891 | 3.219 |
| textiles | 1.903 | 3.297 | 1.749 | 3.369 | 1.828 | 3.276 | 1.868 | 3.242 | 1.821 | 3.214 |
| rubber | 1.868 | 3.305 | 1.795 | 3.307 | 1.906 | 3.202 | 1.843 | 3.277 | 1.786 | 3.273 |
| thermoplastic elastomer debris | 1.891 | 3.287 | 1.821 | 3.294 | 1.944 | 3.123 | 1.857 | 3.206 | 1.802 | 3.258 |

Research has shown that the catalyst obtained by NaOH etching has low fuel oil yield and quality in catalytic pyrolysis of the waste plastics, even lower than the catalyst without etching treatment, because of its strong alkalinity, which damages the main structure of silicon and aluminum, and reacts with exposed metal elements. The reaction products adhere to the surface of the catalyst, covering the active sites, resulting in the catalyst lose most of its catalytic effect.

Embodiment 2

The same process is performed, except that:
in step (2), placing the acid-modified coal gangue powder of step (1) in a $NH_3 \cdot H_2O$ solution, etching under magnetic stirring for 25 minutes, and then washing with water until neutral.

Figure 4:
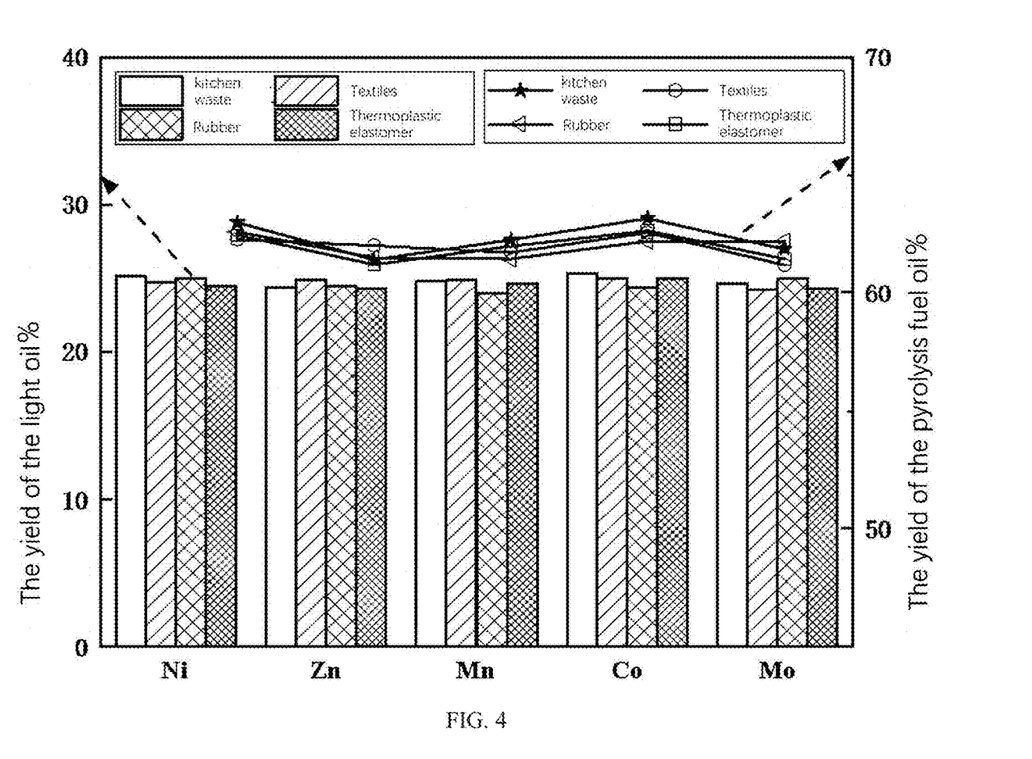
FIG. 4 shows the yield of the fuel oil and the light oil from the catalytic pyrolysis of the waste plastics using a catalyst prepared by the $NH_3 \cdot H_2O$ etched coal gangue.

Performing the pyrolysis experiments of the waste plastics on the catalyst prepared in this embodiment:

The kitchen waste, textiles, rubber, and thermoplastic elastomer debris from a waste treatment plant are used. The steps of the pyrolysis experiment are the same as Embodiment 1. The production of the fuel oil and the light oil of the pyrolysis product are shown in Table 2, and the yield of the fuel oil and the light oil of the pyrolysis product are shown in FIG. 4.

TABLE 2

Production of light oil and heavy oil from pyrolysis of the waste plastics using catalyst prepared by $NH_3 \cdot H_2O$ etching

| | Ni modified | | Zn modified | | Mn modified | | Co modified | | Mo modified | |
|---|---|---|---|---|---|---|---|---|---|---|
| | light oil/g | heavy oil/g | light oil/g | heavy oil/g | light oil/g | heavy oil/g | light oil/g | heavy oil/g | light oil/g | heavy oil/g |
| kitchen waste | 2.512 | 3.787 | 2.436 | 3.706 | 2.479 | 3.747 | 2.534 | 3.782 | 2.464 | 3.722 |
| textiles | 2.473 | 3.754 | 2.492 | 3.710 | 2.488 | 3.684 | 2.502 | 3.754 | 2.421 | 3.698 |
| rubber | 2.499 | 3.761 | 2.449 | 3.701 | 2.396 | 3.749 | 2.435 | 3.785 | 2.497 | 3.724 |
| thermoplastic elastomer debris | 2.450 | 3.796 | 2.427 | 3.694 | 2.468 | 3.731 | 2.498 | 3.767 | 2.433 | 3.712 |

Research has shown that the catalyst obtained from $NH_3 \cdot H_2O$ etching catalyzes the pyrolysis of the waste plastics, resulting in lower fuel oil yield and quality. Due to its stronger alkalinity than organic weak bases, the pore size formed by etching is larger, and there are fewer reactive sites, resulting in poorer catalytic performance.

Embodiment 3

The same process is performed, except that:
in step (2), placing the acid-modified coal gangue powder of step (1) in a n-butylamine solution, etching under magnetic stirring for 25 minutes, and then washing with water until neutral.

Figure 5:
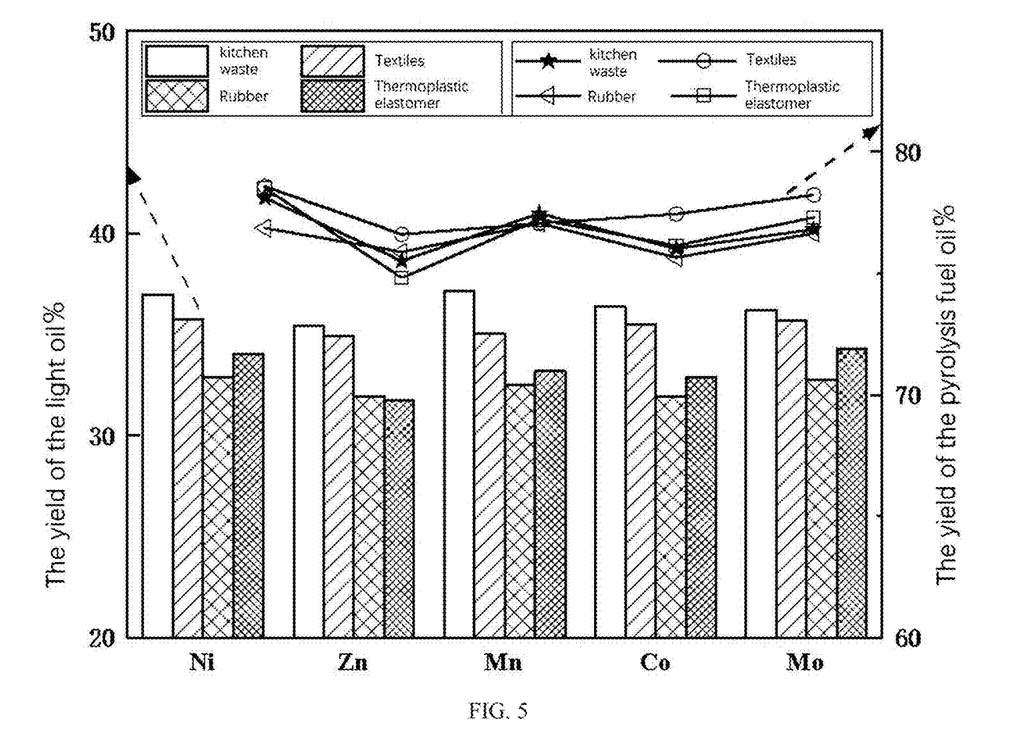
FIG. 5 shows the yield of the fuel oil and the light oil from the catalytic pyrolysis of the waste plastics using a catalyst prepared by the n-butylamine etched coal gangue.

Performing the pyrolysis experiments of the waste plastics on the catalyst prepared in this embodiment:

The kitchen waste, textiles, rubber, and thermoplastic elastomer debris from a waste treatment plant are used. The steps of the pyrolysis experiment are the same as Embodiment 1. The production of the fuel oil and the light oil of the pyrolysis product are shown in Table 3, and the yield of the fuel oil and the light oil of the pyrolysis product are shown in FIG. 5.

TABLE 3

Production of light oil and heavy oil from pyrolysis of the waste plastics using catalyst prepared by n-butylamine solution etching

| | Ni modified | | Zn modified | | Mn modified | | Co modified | | Mo modified | |
|---|---|---|---|---|---|---|---|---|---|---|
| | light oil/g | heavy oil/g | light oil/g | heavy oil/g | light oil/g | heavy oil/g | light oil/g | heavy oil/g | light oil/g | heavy oil/g |
| kitchen waste | 3.694 | 4.117 | 3.538 | 4.013 | 3.708 | 4.039 | 3.634 | 3.968 | 3.619 | 4.063 |
| textiles | 3.573 | 4.284 | 3.488 | 4.173 | 3.502 | 4.204 | 3.544 | 4.200 | 3.568 | 4.255 |
| rubber | 3.285 | 4.409 | 3.193 | 4.386 | 3.247 | 4.459 | 3.191 | 4.413 | 3.271 | 4.394 |
| thermoplastic elastomer debris | 3.397 | 4.353 | 3.171 | 4.311 | 3.317 | 4.405 | 3.289 | 4.376 | 3.427 | 4.326 |

Research has shown that catalysts obtained by n-butylamine etching have good catalytic effects on the pyrolysis of the waste plastics. The coal gangue catalysts modified with different metals have a catalytic yield of 74-79% for the pyrolysis of the waste plastics to produce fuel oil, which is high. The yield of the light oil can reach over 30%. Although the catalytic effects of the different catalysts on different types of the plastics vary, a precise selection should be made in actual production based on cost and the type of waste plastics required for pyrolysis treatment.

Embodiment 4

The same process is performed, except that:
in step (2), placing the acid-modified coal gangue powder of step (1) in a pyrrole solution, etching under magnetic stirring for 25 minutes, and then washing with water until neutral.

Figure 6:
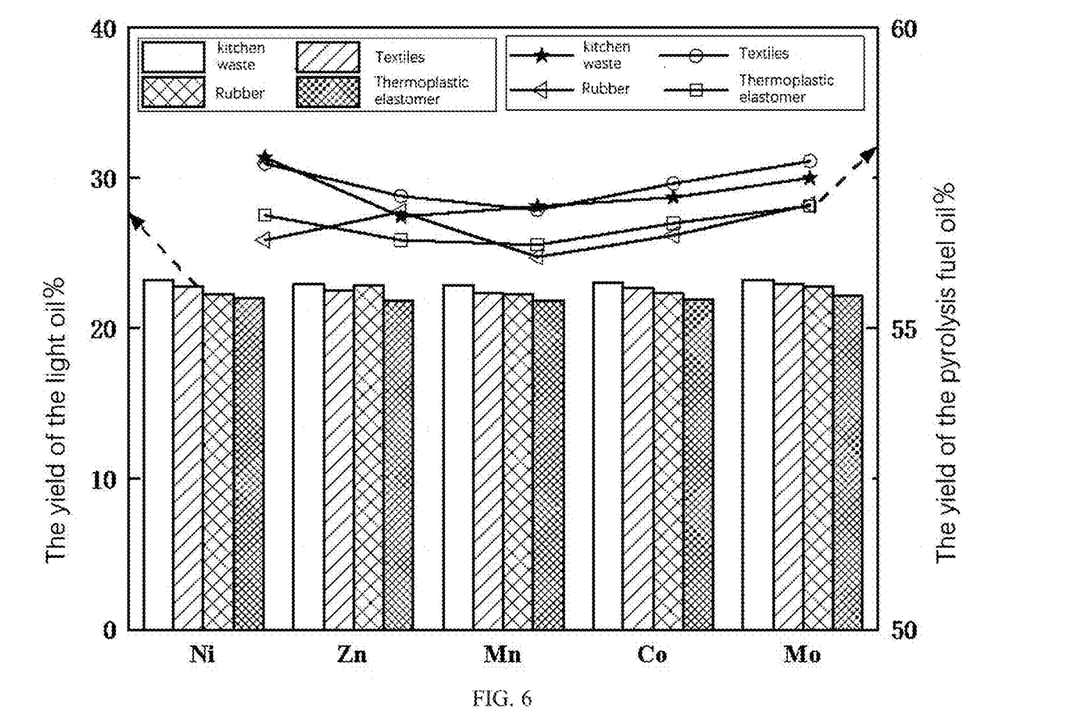
FIG. 6 shows the yield of the fuel oil and the light oil from the catalytic pyrolysis of the waste plastics using a catalyst prepared by the pyrrole solution etched coal gangue.

Performing the pyrolysis experiments of the waste plastics on the catalyst prepared in this embodiment:

The kitchen waste, textiles, rubber, and thermoplastic elastomer debris from a waste treatment plant are used. The steps of the pyrolysis experiment are the same as Embodiment 1. The production of the fuel oil and the light oil of the pyrolysis product are shown in Table 4, and the yield of the fuel oil and the light oil of the pyrolysis product are shown in FIG. 6.

TABLE 4

Production of light oil and heavy oil from pyrolysis of the waste plastics using catalyst prepared by pyrrole solution etching

| | Ni modified | | Zn modified | | Mn modified | | Co modified | | Mo modified | |
|---|---|---|---|---|---|---|---|---|---|---|
| | light oil/g | heavy oil/g | light oil/g | heavy oil/g | light oil/g | heavy oil/g | light oil/g | heavy oil/g | light oil/g | heavy oil/g |
| kitchen waste | 2.316 | 3.468 | 2.291 | 3.395 | 2.287 | 3.416 | 2.301 | 3.417 | 2.324 | 3.426 |
| textiles | 2.281 | 3.493 | 2.253 | 3.467 | 2.236 | 3.461 | 2.272 | 3.469 | 2.297 | 3.481 |
| rubber | 2.226 | 3.421 | 2.282 | 3.412 | 2.227 | 3.392 | 2.231 | 3.424 | 2.275 | 3.431 |
| thermoplastic elastomer debris | 2.199 | 3.489 | 2.186 | 3.461 | 2.184 | 3.455 | 2.194 | 3.481 | 2.216 | 3.488 |

Research has shown that the catalyst obtained by pyrrole solution etching catalyzes the pyrolysis of the waste plastics, resulting in poor yield and quality of pyrolysis oil. This is mainly due to weak alkalinity, poor etching effect, failure to obtain a uniform pore size with high accessibility, fewer reaction active sites, and poor catalytic effect.

Comparative Embodiment 1

The preparation steps of a catalyst for pyrolysis of the waste plastics using the coal gangue as the raw material, comprising:
(1) grinding 10 g of coal gangue into powder, sieving the coal gangue powder into 40 mesh, placing into a 1:1 mixture solution of 16% hydrochloric acid and 30% nitric acid by volume for uniform mixing, placing on a shaking oscillator at 30° C. for 15 minutes, and washing with pure water until neutral to obtain acid-modified coal gangue powder.
(2) mixing the acid-modified coal gangue powder of step (1) evenly with nickel nitrate solution, zinc nitrate, manganese nitrate, cobalt nitrate, and ammonium molybdate; loading catalysts with 5% loading of each metal using the equal-volume impregnation method; after filtration, washing with deionized water until neutral to obtain a catalyst with a loading of 5%.
(3) placing the metal modified catalysts of step (2) into the molding machine, and adding 4 g of high-temperature resistant adhesive HR-8767 and an appropriate amount of water; after molding, drying in a vacuum dryer at 110° C. for 10 hours until the liquid disappears; then calcinating the catalyst in a muffle furnace at 550° C. for 4 hours to activate and ultimately produce catalysts modified by different metals.

Figure 7:
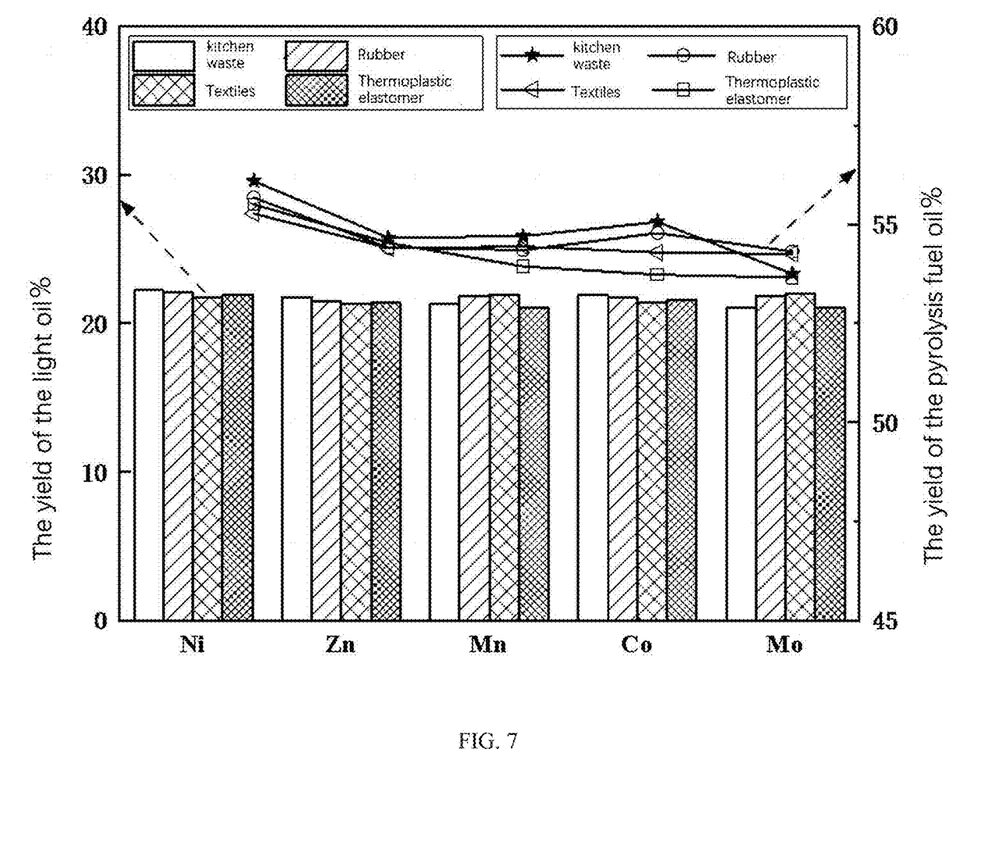
FIG. 7 shows the yield of fuel oil and light oil from the catalytic pyrolysis of waste plastics using a catalyst that have not been etched.

Performing the pyrolysis experiments of the waste plastics on the catalysts prepared in this comparative embodiment:

Four catalytic pyrolysis experiments are performed on the kitchen waste, textiles, rubber, and thermoplastic elastomer debris from a certain garbage treatment plant using the prepared metal modified catalyst. 10 g of waste plastic and 5 g of metal modified coal gangue catalyst are used respectively, and placed in the pyrolysis section and catalytic section sleeves of a two-stage fixed bed reactor for catalytic pyrolysis experiments. The pyrolysis section and catalytic section temperatures are 550° C. and 500° C., respectively. The pyrolysis is performed for 30 minutes. The bottom liquid phase product pyrolysis oil is collected, and the light oil and heavy oil are extracted and separated, and weighed separately. The production of the pyrolysis product fuel oil and light oil are shown in Table 5, and the yield of the pyrolysis fuel oil and light oil are shown in FIG. 7.

TABLE 5

Production of light oil and heavy oil from pyrolysis of the waste plastics using unetched catalysts

| | Ni modified | | Zn modified | | Mn modified | | Co modified | | Mo modified | |
|---|---|---|---|---|---|---|---|---|---|---|
| | light oil/g | heavy oil/g | light oil/g | heavy oil/g | light oil/g | heavy oil/g | light oil/g | heavy oil/g | light oil/g | heavy oil/g |
| kitchen waste | 2.224 | 3.385 | 2.177 | 3.289 | 2.129 | 3.341 | 2.195 | 3.311 | 2.104 | 3.271 |
| textiles | 2.206 | 3.361 | 2.146 | 3.295 | 2.186 | 3.249 | 2.176 | 3.302 | 2.185 | 3.246 |
| rubber | 2.178 | 3.349 | 2.133 | 3.307 | 2.193 | 3.251 | 2.143 | 3.286 | 2.201 | 3.224 |
| thermoplastic elastomer debris | 2.196 | 3.354 | 2.141 | 3.312 | 2.106 | 3.288 | 2.156 | 3.217 | 2.109 | 3.257 |

In summary, the preparation of a catalyst for pyrolysis of the waste plastics of the present disclosure is easily operable, the raw materials are easily obtained. Impurities are easily removed by acid modification of the coal gangue, and further alkaline etching is performed to obtain a relatively uniform and highly accessible pore structure. Finally, the catalyst is prepared by loading metal. Experimental research has shown that in the alkaline etching step, the catalyst obtained by n-butylamine etching in weak base has the best effect. Due to its uniform pore structure, the metal loading is also uniform, and contains a large amount of metal elements. When combined with the loaded metal in the catalytic process, a synergistic effect is created, which can achieve efficient and high-quality catalytic effects.

The parts not mentioned in the present disclosure can be implemented by referring to existing technologies.

Certainly, the above descriptions are merely preferred embodiments of the present disclosure. The present disclosure is not limited to the above embodiments listed. It should be noted that, all equivalent replacements and obvious variations made by any person skilled in the art under the teaching of the specification fall within the essential scope of the specification and shall be protected by the present disclosure.

What is claimed is:

1. A method for preparing a catalyst for pyrolysis of waste plastics to produce oil, wherein comprising:
   Step 1: washing and modifying coal gangue powder with acid to obtain acid-modified coal gangue powder;
   Step 2: placing the acid-modified coal gangue powder of Step 1 in an alkaline solution, and etching under magnetic stirring for 20-30 minutes, then washing with water until neutral;
   Step 3: placing the washed coal gangue powder of step 2 in a solution containing metal ions, and loading the metal ions onto the washed coal gangue powder by impregnation, and then filtering and washing to obtain a catalyst loaded with metal;
   Step 4: placing the catalyst loaded with metal of Step 3 into a molding machine, and adding with adhesive and water, to compress into a shape;
   Step 5: drying the compressed catalyst of Step 4, then calcinating in a muffle furnace, and activating to obtain a product;
   wherein in Step 2, the alkaline solution is a weak base with a concentration of 0.5 mol·L$^{-1}$;
   a volume ratio of the coal gangue powder to the weak base is 1:1.0-1.5; and
   the weak base is a solution of n-butylamine.

2. The method for preparing the catalyst for pyrolysis of waste plastics to produce oil according to claim 1, wherein in step 1, grinding the coal gangue into the coal gangue powder, sieving the coal gangue powder into 30 to 50 meshes, and washing and modifying with acid is to evenly mix the coal gangue powder with an acid solution, and then washing with the acid under ultrasonic at 25 to 50° C. for 10 to 20 minutes, then removing surface impurities by washing with water, and washing until neutral.

3. The method for preparing the catalyst for pyrolysis of waste plastics to produce oil according to claim 2, wherein the acid solution is hydrochloric acid, nitric acid, or a mixture of the two.

4. The method for preparing the catalyst for pyrolysis of waste plastics to produce oil according to claim 1, wherein in step 3, the solution containing metal ions is nickel nitrate, zinc nitrate, manganese nitrate, cobalt nitrate or ammonium molybdate, with a metal loading of 5%.

5. The method for preparing the catalyst for pyrolysis of waste plastics to produce oil according to claim 1, wherein in step 4, the shape is strip, ingot, single column, annular or spherical.

6. The method for preparing the catalyst for pyrolysis of waste plastics to produce oil according to claim 1, wherein in step 5, drying the compressed catalyst in a vacuum dryer at 100-120° C. for 8-10 hours; calcinating in the muffle furnace at 500-600° C. for 4-5 hours.

* * * * *